United States Patent [19]
Maus et al.

[11] Patent Number: 5,916,530
[45] Date of Patent: *Jun. 29, 1999

[54] CATALYTIC REACTOR

[75] Inventors: Wolfgang Maus; Rolf Brück, both of Bergisch Gladbach; Georg Bestenreiner, Roesrath, all of Germany

[73] Assignee: Emitec Gesellschaft fuer Emissionstechnologie mbH, Lohmar, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,784

[22] Filed: Feb. 28, 1997

Related U.S. Application Data

[63] Continuation of application No. PCT/EP95/03373, Aug. 25, 1995.

[30] Foreign Application Priority Data

Aug. 29, 1994 [DE] Germany ............................ 44 30 645

[51] Int. Cl.[6] ................. B01D 53/34; F01N 3/10
[52] U.S. Cl. .......................... 422/179; 422/174; 422/175; 422/180
[58] Field of Search ................ 422/179, 180, 422/174, 175, 222, 199, 171; 428/116, 593, 594; 502/439, 527; 60/299

[56] References Cited

U.S. PATENT DOCUMENTS

| | | | |
|---|---|---|---|
| 3,947,252 | 3/1976 | Musall et al. | 422/179 |
| 3,948,611 | 4/1976 | Stawsky | 422/179 |
| 4,680,239 | 7/1987 | Yano et al. | 428/688 |
| 4,713,361 | 12/1987 | Maus | 428/593 |
| 4,775,518 | 10/1988 | Abthoff et al. | 422/180 |
| 5,278,125 | 1/1994 | Iida et al. | 502/527 |
| 5,413,767 | 5/1995 | Breuer et al. | 422/174 |
| 5,419,876 | 5/1995 | Usui et al. | 422/179 |

FOREIGN PATENT DOCUMENTS 2298620  12/1990  Japan.

*Primary Examiner*—Hien Tran
*Attorney, Agent, or Firm*—Herbert L. Lerner; Laurence A. Greenberg

[57] ABSTRACT

A catalytic reactor for catalytic conversion of exhaust gases, in particular exhaust gases from internal combustion engines, includes a honeycomb body disposed in a metallic casing. The honeycomb body has a large number of channels through which exhaust gas can flow, a gas inlet side and a gas outlet side. The honeycomb body is thermally insulated by internal insulation over a part of its length from the gas inlet side onward and preferably also from the gas outlet side onward, with respect to an inner surface of the casing. An outer surface of the casing also has thermal insulation at least in some regions. The casing serves as a heat store or accumulator, at least in some regions. This construction provides advantageous properties during both cold starting and hot starting as one sub-region rapidly heats up during cold starting and one sub-region only slowly cools down after prolonged operation due to storage of heat in the casing.

19 Claims, 2 Drawing Sheets

CATALYTIC REACTOR

CROSS-REFERENCE TO RELATED APPLICATION

This application is a continuation of International application Ser. No. PCT/EP95/03373, filed Aug. 25, 1995.

BACKGROUND OF THE INVENTION

1. Field of the Invention

The invention relates to a catalytic reactor for catalytic conversion of exhaust gases, in particular for catalytic conversion of exhaust gases from internal combustion engines.

A catalytic reactor for emission control, in particular for motor vehicle engines, which is known from German Utility Model G 87 12 267.7 U1, is provided with a honeycomb body in which flow channels for exhaust gas are formed. The honeycomb body is disposed in a sleeve-like casing. Heat insulation is provided between the honeycomb body and an inner surface of the casing, so that during operation the casing cannot become too hot. German Utility Model G 87 12 267.7 U1 further proposes to provide the casing with an external insulating shell for heat insulation. Excessively large thermal gradients between the casing and the honeycomb body are prevented and surrounding components are protected from heat through the use of those measures.

A catalytic reactor which is known from European Patent 0 229 352 B1, corresponding to U.S. Pat. No. 4,713,361, is provided with internal and external insulation. Heat radiation towards the outside is reduced through the use of that measure.

The catalytic conversion of exhaust gases takes place above a temperature of 300° C. If the catalytic reactor has not yet reached that temperature, the exhaust gas flows through the reactor without the desired conversion of the exhaust gas into harmless components taking place.

Different proposals have already been made for reaching the temperature at which the catalytic conversion begins as quickly as possible. The starting point of those proposals is the goal of heating up the catalytic converter as quickly as possible. For that reason, it has been proposed to use a pre-catalyst, the mass of which is relatively small as compared to the main catalytic converter. On the other hand, it has also been proposed to construct heatable catalytic converters, as is seen in the SAE Technical Paper 940470 entitled "Heating Catalytic Converter Competing Technologies to Meet LEV Emission Standards" by P. Langen et al.

A catalytic reactor for catalytic conversion of exhaust gases, in particular for exhaust gases of internal combustion engines, is known from U.S. Pat. No. 5,278,125. The reactor includes a honeycomb body provided with a large number of channels through which the exhaust gases can flow. The honeycomb body has a gas inlet side and a gas outlet side. The honeycomb body is thermally insulated from the gas inlet side onward over part of its length with respect to an internal casing in the housing of a casing. The required temperature is reached quickly in a front area of the honeycomb body through the use of the thermal insulation.

SUMMARY OF THE INVENTION

It is accordingly an object of the invention to provide a catalytic reactor, which overcomes the hereinafore-mentioned disadvantages of the heretofore-known devices of this general type in such a way that it not only reaches a temperature required for catalytic conversion in a front sub-region upon cold starting, but it also still maintains its working temperature for as long as possible when operation is interrupted or it reaches it again quickly.

With the foregoing and other objects in view there is provided, in accordance with the invention, a catalytic reactor for catalytic conversion of exhaust gases, in particular for exhaust gases from internal combustion engines, comprising a metallic casing having inner and outer surfaces; a honeycomb body disposed in the metallic casing, the honeycomb body having a gas inlet side, a gas outlet side and a multiplicity of channels for conducting an exhaust gas flow; internal insulation thermally insulating the honeycomb body from the inner surface of the casing over at least a partial length of the honeycomb body beginning from the gas inlet side; and thermal insulation disposed on at least part of the outer surface of the casing, causing the casing to serve at least regionally as a heat store or accumulator.

If the catalytic reactor is cold it requires a certain amount of time until it reaches its working temperature through the use of the hot exhaust gases coming from an internal combustion engine. During this heating phase the catalytic surface of the honeycomb body is entirely or partially ineffective. In order to improve the heating behavior of the honeycomb body, it is provided with thermal insulation from the gas inlet side onwards over at least a part of its length with respect to the casing. This insulation prevents the casing from drawing heat from the front area of the honeycomb body directly after cold starting and consequently delaying the catalytic conversion. If exhaust gas is fed to the catalytic reactor over a certain period of time, the casing is also heated up either through the thermal insulation or by some parts of the honeycomb body not being thermally insulated with respect to the casing. The casing then acts as a heat store or accumulator. If hot exhaust gas is no longer fed to the reactor, the casing retains the stored heat or mainly releases it to the honeycomb body as the external insulation of the casing limits the heat loss to the outside.

If an exhaust gas is again supplied to the catalytic reactor, the reactor is already at its working temperature, at least in some areas, or reaches it relatively quickly in dependence on the duration of the cooling down phase.

This configuration of the catalytic reactor ensures that the reactor reaches its operating temperature relatively quickly after a certain cooling phase, so that strict emission regulations can be better satisfied.

A catalytic reactor of this type can contribute in particular to satisfying the strict California emission controls. According to those regulations the exhaust gas output is measured in three test sections (FTP-75). In the first test section the exhaust gas emission is measured during cold starting and in a cold transitional phase. That test section lasts for 505 seconds. Following that, in a period of time between 505 and 1,372 seconds, the exhaust gas output is measured. After that hot running phase the engine of a motor vehicle is switched off for 10 minutes and after that cooling off phase it is started again. The emission of harmful substances after hot starting is measured within a period of time of 505 seconds. The configuration according to the invention provides advantageous behavior in the first, cold starting phase because of the internal insulation, and additional advantageous behavior during hot starting because of the external insulation.

In accordance with another feature of the invention, the internal insulation is provided by an air gap.

In accordance with a further feature of the invention, an insulating jacket is used for insulation. This feature has the advantage of permitting the insulating jacket to be used for compensating for thermal stresses.

In accordance with an added feature of the invention, the internal insulation is formed by a layer with low heat conductivity. It can be a fibrous substance, which preferably contains ceramic fibers. However, the outer channels of the honeycomb body can also serve as insulation when the exhaust gas is prevented from flowing through these channels by a suitable construction.

In accordance with an additional feature of the invention, there is either an insulating jacket wrapped around the casing, a second housing surrounding the casing with an air gap between the second housing and the casing or there are additional honeycomb bodies attached to the casing.

In accordance with yet another feature of the invention, the the outer surface of the casing is coated with a thermally insulating material. The casing can, for example, be foamed or sprayed with a thermally stable plastic or the like.

In accordance with yet a further feature of the invention, since the casing acts at least partially as a heat store or accumulator, the casing is manufactured with a thickness and/or from a substance which has a high heat storage capacity as compared to the honeycomb body.

In accordance with yet an added feature of the invention, the casing is provided with heat storage elements. The heat storage elements are advantageously disposed in a region where the honeycomb body is connected to the housing casing, so that a rapid release of heat can take place from the heat storage elements to the honeycomb body.

In accordance with yet an additional feature of the invention, the heat storage elements are formed of a substance with a high specific heat capacity. This has the advantage of permitting the mass of the reactor to be kept low, so that the mechanical stress of the exhaust gas system in which the reactor is disposed can be kept low, since the forces occurring because of acceleration are not so great.

In accordance with again another feature of the invention, the use of a latent heat store or accumulator as the heat storage element is also possible and in that case it should preferably be disposed in a central region of the casing.

In accordance with again a further feature of the invention, the honeycomb body includes at least two sub-bodies disposed one behind the other and possibly connected to one another. The front sub-body is also heatable, in particular electrically heatable. The heating accelerates the heating up of the front sub-body to the working temperature without heat being consumed to heat up the casing. The thermal insulation of the heatable sub-body can also be electrical insulation at the same time.

In accordance with again an added feature of the invention, according to an important principle, the heat loss from the first sub-region of the catalytic converter, as seen in the direction of flow, to the casing is kept low in order obtain a rapid response in the cold starting phase. After the engine is started, heat is transferred to and stored in the casing and in the heat storage elements. When the engine is later turned off, the casing and heat storage elements transfer heat back to the honeycomb body so that the honeycomb body can reach its operating temperature quicker when the engine is restarted. The heat stored in the casing tube is then slowly released to the central part of the honeycomb body.

In accordance with another feature of the invention, the at least two sub-regions include frontmost and rear sub-regions, in which the internal insulation thermally insulates a part of the honeycomb body from the inner surface of the casing. The part of the honeycomb body that is thermally insulated from the casing is from 8 to 80 mm long and is preferably from 30 to 60 mm long.

In accordance with yet another feature of the invention, the internal insulation has less insulating resistance than the thermal insulation.

In accordance with a concomitant feature of the invention, since in this phase heat losses mainly take place through the end surfaces of the honeycomb body, the rear part of the honeycomb body is also thermally insulated from the casing tube. The end surface then loses less energy. In this way the front and rear sub-regions protect the central area from heat loss at the end surfaces.

Other features which are considered as characteristic for the invention are set forth in the appended claims.

Although the invention is illustrated and described herein as embodied in a catalytic reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
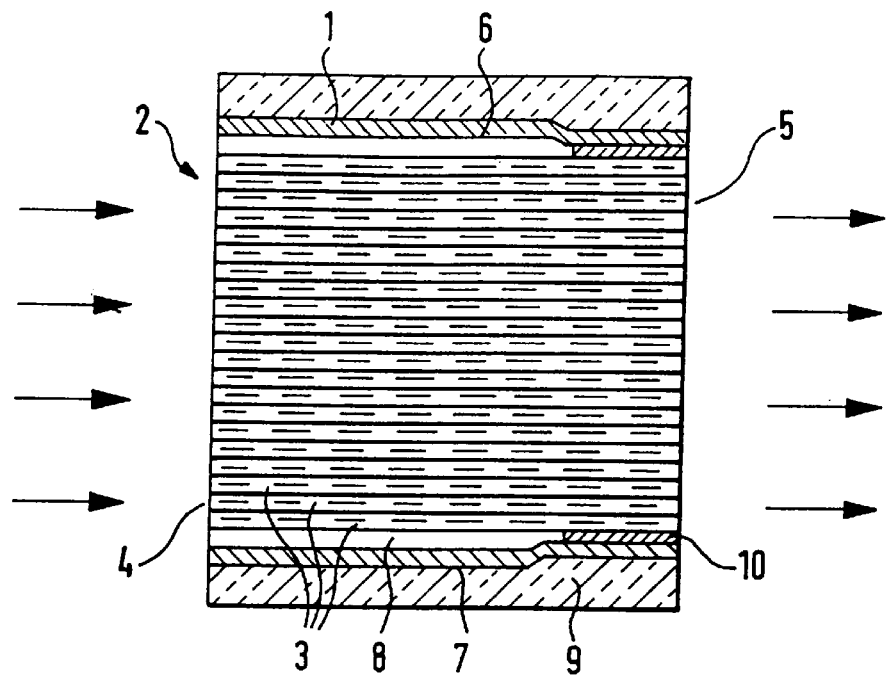
FIG. 1 is a diagrammatic, longitudinal-sectional view of a first embodiment of a catalytic reactor according to the invention.

Referring now to the figures of the drawings in detail and first, particularly, to FIG. 1 thereof, there is seen a reactor which includes a catalytically operating honeycomb body 2 that is disposed in a casing 1. The honeycomb body 2 is provided with channels 3 through which an exhaust gas can flow. The honeycomb body 2 is connected to the casing 1. In the first and second embodiments the honeycomb body 2 is connected to the casing 1 with a metallic bonding layer 10 which is connected between them. The bonding layer 10 is preferably formed of a substance which has good heat conductivity.

The honeycomb body 2 is thermally insulated from an inner surface 6 of the casing 1 over at least a part of its length. A thermal internal insulation 8 extends from a gas inlet side 4 of the honeycomb body 2 towards a gas outlet side 5 thereof. In the embodiment shown in FIG. 5, the internal insulation 8 is created by formation of an air gap.

Figure 2:
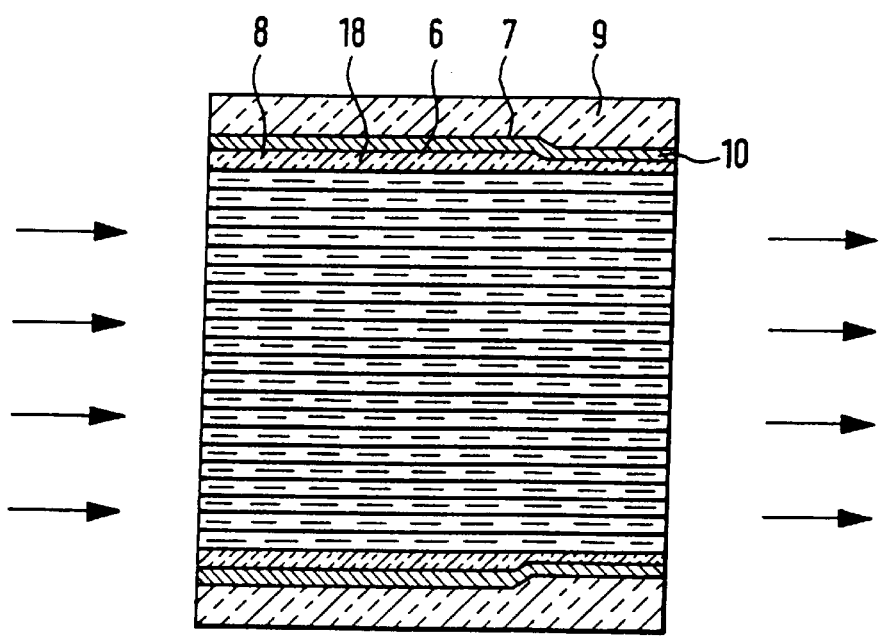
FIG. 2 is a longitudinal-sectional view of a second embodiment of the catalytic reactor.

The embodiment shown in FIG. 2 differs from the first embodiment with respect to the internal insulation 8, in such a way that the internal insulation 8 is created by an insulating jacket 18. In both FIGS. 1 and 2, external insulation 9 is fitted to an outer surface 7 of the casing 1.

Figure 3:
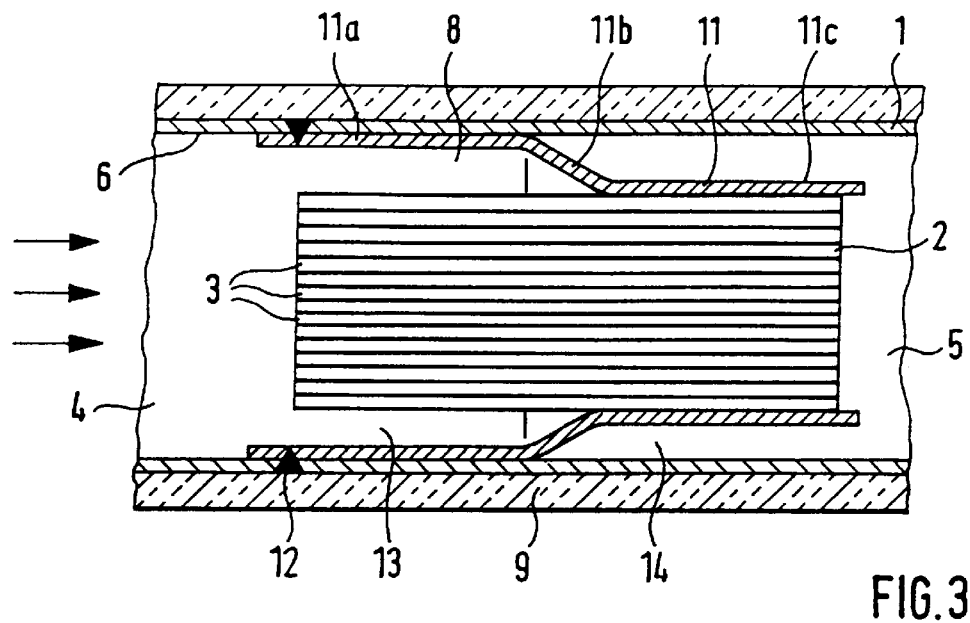
FIG. 3 is a longitudinal-sectional view of a third embodiment of the catalytic reactor.

FIG. 3 shows a third embodiment of a catalytic reactor according to the invention. The honeycomb body 2 is provided with channels 3 through which a fluid can flow. The honeycomb body 2 is joined to the casing 1 through the use of a connecting tube 11. The connecting tube 11 is divided into three sub-regions, namely a first sub-region 11a adjacent the inner surface 6 of the casing 1, a second sub-region 11b tapering conically towards the inside, and a third sub-region 11c adjacent the honeycomb body 2.

The first sub-region 11a is joined, for example through the use of a welded joint 12, to the casing 1. The third sub-region 11c can, for example, be brazed onto the metallic honeycomb body 2.

A first gap 13 is formed between the first sub-region 11a and the honeycomb body 2 through the use of the configuration of the connecting tube 11. Furthermore, a second gap 14 is formed between the casing 1 and the third sub-region 11c.

The gaps 13, 14 act as thermal insulation and thus thermally de-couple the casing 1 from the honeycomb body 2. The second sub-region 11b of the connecting tube 11 acts as a thermal bridge. Through the use of this thermal bridge, on one hand heat is conducted to the casing 1 through the sub-region 11a, and on the other hand heat is diverted from the casing 1 to the honeycomb body 2 through the use of the sub-regions 11a, 11b and 11c when there is a temperature gradient between the honeycomb body and the casing.

The casing 1 acts as a heat store or accumulator and has the external insulation 9. An insulating substance can also be fitted into the gap 13 and/or the gap 14.

When the connecting tube 11 is made sufficiently thick, for example with a thickness of 0.5 to 2 mm and preferably approximately 1 mm, it acts as a casing itself, which is insulated in the front sub-region 11c from the honeycomb body 2 and is adjacent the honeycomb body 2 in the rear sub-region 11a, which is advantageous for the initiation and hot-starting behavior of the catalytic reactor.

Figure 4:
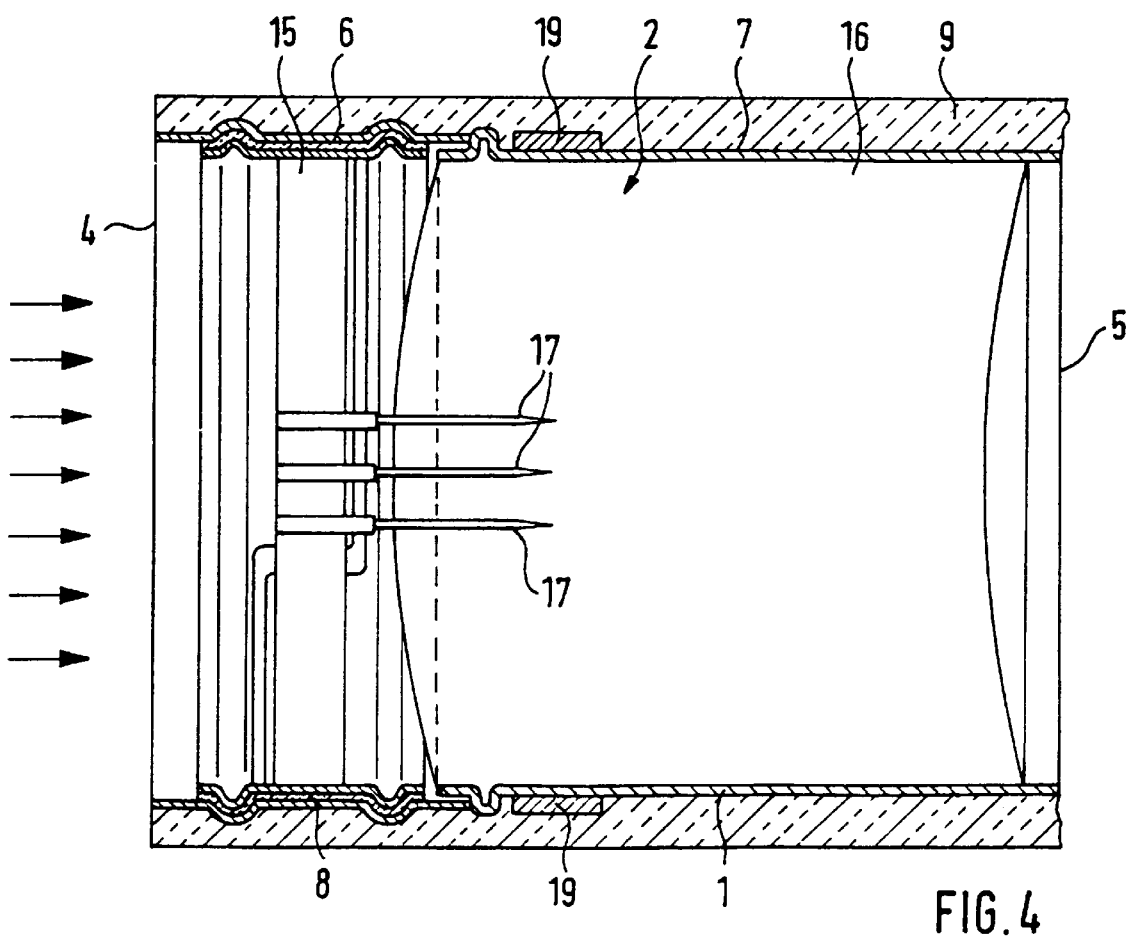
FIG. 4 is a longitudinal-sectional view of a catalytic reactor with a first heatable sub-body and a second sub-body.

FIG. 4 shows a honeycomb body 2 which is divided into first and second sub-bodies 15 and 16. The sub-bodies 15, 16 are disposed one behind the other in the flow direction. The sub-bodies 15, 16 are joined together through the use of supporting structures 17. The first sub-body 15 is electrically heatable, and an internal insulation 8 which is provided between the sub-body 15 and the inner surface 6 of the casing 1 thermally and electrically insulates the sub-body 15 with respect to the inner surface 6. The internal insulation 8 can serve to hold the sub-body 15 in the casing 1. The second sub-body 16 is joined directly to the casing 1. The external insulation 9 is provided on the outer surface 7 of the casing 1.

During cold starting the sub-body 15 is heated by a non-illustrated heating device. The sub-body 15 reaches the operating temperature relatively quickly through the use of the electric heating. After reaching the operating temperature, the heating device is switched off. The sub-body 15 is thermally insulated with respect to the casing 1, so that a transfer of heat to the casing does not take place at all, or only to a very small extent. The second sub-body 16 releases heat to the casing 1 when it heats up later during prolonged operation. This heat is stored to a limited extent in the casing 1 by the external insulation 9 and, where present, in additional heat storage elements 19.

If no exhaust gas is fed to the catalytic reactor for a certain period of time, the temperature in the sub-bodies 15 and 16 decreases. The heat energy stored in the casing 1 is released to the sub-body 16, so that it only cools down relatively slowly and so that when exhaust gas is supplied again, the sub-body 16 is still above the temperature required for the catalytic action or reaches it relatively quickly.

These measures can prevent the heating having to be used again, which would greatly burden the battery of a motor vehicle.

Through suitable selection of the dimensions of the thermally insulated front sub-region of a catalytic reactor, the heat conducting capabilities of the two insulating layers and/or the heating capacity of the casing, which can, where appropriate, be made even larger in some areas through the use of heat storage elements, cold starting behavior, as well as hot starting behavior, can be improved even though the two properties actually mutually affect one another. The invention therefore makes an important contribution to satisfying stricter emission control regulations.

We claim:

1. A catalytic reactor for catalytic conversion of exhaust gases, comprising:
   a metallic casing having inner and outer surfaces;
   a metallic honeycomb body disposed in said metallic casing, said honeycomb body having a gas inlet side, a gas outlet side and a multiplicity of channels for conducting an exhaust gas flow;
   internal insulation having a thermal resistance thermally insulating said honeycomb body from said inner surface of said casing over at least a partial length of said honeycomb body beginning from said gas inlet side; and
   thermal insulation disposed on at least part of said outer surface of said casing and having a thermal resistance greater than said thermal resistance of said internal insulation causing said casing to serve as a heat store for heating said honeycomb body when said honeycomb body is no longer heated by exhaust gases of an internal combustion engine and without drawing significant heat from said honeycomb body to said casing over said partial length during cold starting of the internal combustion engine.

2. The catalytic reactor according to claim 1, wherein said internal insulation is an air gap.

3. The catalytic reactor according to claim 1, wherein said internal insulation is an insulating jacket.

4. The catalytic reactor according to claim 1, wherein said internal insulation is a thermal insulator.

5. The catalytic reactor according to claim 1, wherein said internal insulation includes at least one gap formed between said honeycomb body and said metallic casing.

6. The catalytic reactor according to claim 1, wherein said thermal insulation is an insulating jacket.

7. The catalytic reactor according to claim 1, wherein said thermal insulation is a thermally insulating material coating said casing.

8. The catalytic reactor according to claim 1, including an external housing surrounding said casing, said thermal insulation disposed between said external housing and said casing.

9. The catalytic reactor according to claim 1, wherein said casing has a heat storage capacity.

10. The catalytic reactor according to claim 8, wherein said honeycomb body has walls, and said casing has at least one of a thickness and a material providing a high heat storage capacity as compared to said walls of said honeycomb body.

11. The catalytic reactor according to claim 9, wherein said casing has heat storage elements, and at least one of said casing and said heat storage elements are formed of a substance having a heat storage capacity.

12. The catalytic reactor according to claim 9, wherein at least parts of said casing are latent heat stores.

13. The catalytic reactor according to claim 1, wherein said honeycomb body has at least two sub-bodies disposed one behind the other and joined together, and said sub-bodies include a heatable front sub-body.

14. The catalytic reactor according to claim 1, wherein said honeycomb body has at least two sub-bodies disposed one behind the other.

15. The catalytic reactor according to claim 14, wherein said at least two sub-bodies include front and rear sub-bodies, and said internal insulation is disposed only at said front sub-body.

16. The catalytic reactor according to claim 1, wherein said honeycomb body has at least two sub-regions including frontmost and rear sub-regions disposed one behind the other, said internal insulation thermally insulates a part of said honeycomb body from said inner surface of said casing, and said part of said honeycomb body substantially decreases a heat loss from said frontmost sub-region to said rear sub-region through heat transfer to said casing, during cold starting of an internal combustion engine until an initiation temperature required for a catalytic reaction is reached.

17. The catalytic reactor according to claim 16, wherein said part of said honeycomb body thermally insulated from said inner surface of said casing is 8 to 80 mm long.

18. The catalytic reactor according to claim 16, wherein said part of said honeycomb body thermally insulated from said inner surface of said casing is 30 to 60 mm long.

19. The catalytic reactor according to claim 14, wherein said at least two sub-bodies include front and rear sub-bodies and at least one of said front and rear sub-bodies is thermally insulated from said casing.

* * * * *